Figure 1:
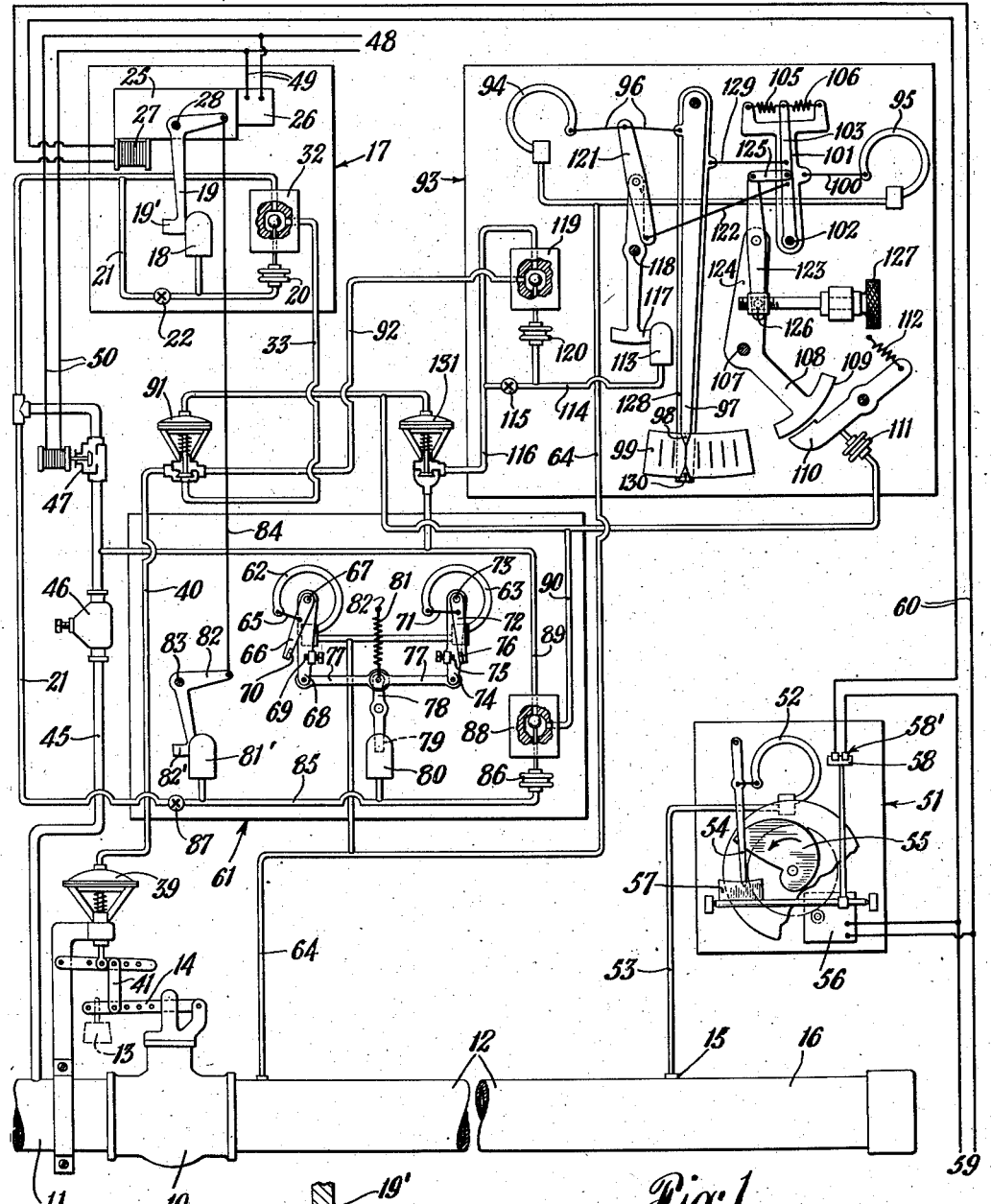

July 20, 1943. E. H. HART 2,324,579
AUTOMATIC CONTROL APPARATUS
Filed Feb. 28, 1941

INVENTOR
EUGENE H. HART
BY E. C. Sanborn
ATTORNEY

Patented July 20, 1943

2,324,579

UNITED STATES PATENT OFFICE 2,324,579

AUTOMATIC CONTROL APPARATUS

Eugene H. Hart, Waterbury, Conn., assignor to The Bristol Company, Waterbury, Conn., a corporation of Connecticut Application February 28, 1941, Serial No. 380,984

18 Claims. (Cl. 50—10)

This invention relates to automatic control of fluid pressure, and more especially to means for automatically controlling the pressure of natural gas in a distribution system and at the same time providing for emergency or abnormal conditions which may arise.

In the control of pressure in systems where natural gas is distributed through a local system, it is customary to provide at the point of supply from a high pressure pipe line a regulating valve which automatically reduces the pressure from that of the pipe line to a predetermined distribution value. Regulators for this purpose are well-known, and are available in a wide variety of forms.

The distribution or "downstream" pressure at a regulating valve of this type is usually controlled by a weight adjustably positioned on a lever arm; and in many installations it is customary for an attendant to visit the regulator periodically during the day and adjust this weight so as to modify the pressure to meet variable demands on the gas. Since it is quite usual for regulators of this type to be located on the outskirts of a municipality, it is frequently desirable, in order that change of head due to flow conditions be taken care of, that the "downstream" pressure at the regulator be set to a value considerably different from the pressure value which is required at the actual center of distribution.

With this in view there have been developed various systems whereby the pressure at a selected point in the distribution system is continuously measured, and by some form of remote control equipment (usually electrical) caused to adjust the setting of the regulator so that a substantially constant pressure will be maintained at the point of measurement without respect to the actual pressure on the "downstream" side of the regulator.

Owing to the hazardous conditions attending distribution of gas, it is highly important that auxiliary regulating apparatus of this class incorporate very complete "fail-safe" features, so that upon the development of any abnormal condition which might affect the performance of the control apparatus in an undesirable manner, the system will continue to operate without the introduction of any dangerous condition, and with a minimum of interference with distribution of gas at a normal pressure value.

Among the causes which may be enumerated as possible sources of undesirable condition, there may be mentioned the attainment of an abnormally high or abnormally low pressure at the point of distribution, or the failure of the electrical supply upon which the remote regulating system is dependent for its operation or damage to any of the interconnecting electrical circuits.

In this invention provision is made of auxiliary control devices interlocked with a remote regulating system, which may be of a more or less conventional type, whereby the hereinabove mentioned abnormal conditions are infallibly met, and at the same time a minimum of departure from normal operating conditions introduced.

Other features and advantages will be hereinafter more particularly described and claimed.

Fig. 1 of the drawing is a diagrammatic representation of a gas control system embodying the principles of the invention.

Figure 2:
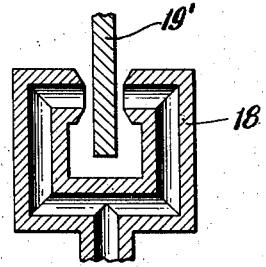

Fig. 2 is a sectional view to an enlarged scale of an element incorporated in the controlling mechanism.

Referring to Fig. 1 of the drawing, the numeral 10 represents a weighted regulating valve adapted for the supply of gas from a high pressure main 11 to a low pressure main 12 at a predetermined pressure covered by the effective action of a weight 13 adjustably positioned on a lever arm 14 forming an element of the valve 10 and so associated with the internal parts thereof that an increase in the effective influence of said weight will produce an increase in pressure of gas as delivered to the main 12, while a decrease of said action will be reflected in a corresponding lowering of said pressure.

Automatic control of the regulated pressure at the valve 10 is effected by instrumentalities hereinafter to be described superimposing their influence upon said regulator and governed in turn by pressure as measured at a point 15 on a "dead-end" connection 16 located at a selected point of the distribution system. The instrumentality through which the basic control of the regulator 10 is effected may preferably consist of a pneumatic control device 17 embodying the principle fully set forth in U. S. Letters Patent 1,880,247, issued October 4, 1932, to applicant's assignee. As utilized in this invention the instrument 17 includes an orifice member 18 having operatively associated therewith a movable vane 19' on a lever 19 as shown in detail in Fig. 2, adapted to obstruct the escape of air or other fluid from said orifice member, and thereby to affect the pressure within a bellows member 20 directly connected to said orifice member and supplied with pressure fluid from a conduit 21 through a constriction 22. Mounted in the instrument 17 is a telemetric receiving apparatus 25 preferably of the type disclosed in U. S. Letters Patent 2,040,918, issued to applicant's assignee, May 19, 1936, and including a constant speed electric motor 26, an electromagnet 27, and a spindle or shaft 28, carrying the vane member 19', the elements of said telemetering apparatus being so interrelated that the positioning of said spindle through a limited angle by action of the motor 26 will be dependent upon the relative durations of cyclically recurrent impulses imparted to the electromagnet 27.

A three-way pilot valve 32 is connected to the conduit 21 and adapted for operation from the bellows 20 in such a manner that the pressure of air or other elastic fluid derived from conduit 21 may be regulated in conduit 33 according to the pressure within said bellows member. The combination of the valve 32, the bellows 20, the orifice member 18, and the vane 19' together with the constriction 22 constitutes the equivalent of a pneumatic controller as set forth in above-mentioned U. S. Letters Patent 1,880,247.

Mounted in proximity to the regulating valve 10 is a pneumatically actuated diaphragm member 39, adapted to be subjected to fluid pressure through a conduit 40 (which, under conditions hereinafter to be set forth, may be connected to the conduit 33). The member 39 is connected through a linkage 41 to the arm 14 of the regulator, and may, or may not, entirely replace the weight 13, whereby the loading on said arm, and therefore the output pressure of the regulator, will be subject to pneumatic pressure existing in said diaphragm element. While, of course, compressed air may be employed as the working medium in carrying out the controlling functions of the instrument as thus far described, it will be obvious that gas may be utilized in lieu of compressed air. For this purpose the conduit 21 is supplied with gas taken from the pipe line 11 through a conduit 45 and a regulator or reducing valve 46 adapted to reduce the pressure to a value suited to use in the controlling mechanism. Between the regulator 46 and the conduit 21 is installed a normally-closed solenoid-operated valve 47 the purpose of which will hereinafter be set forth. Electric power from a source 48 is applied through a circuit 49 to the motor 26; and the solenoid-operated valve 47 is energized from the same source through a circuit 50.

In order that the action of the controlling mechanism may be rendered subject to the pressure at a selected point in the system, an instrument 51 including a pressure-sensitive member 52 is installed in proximity to the center of distribution, with said member connected by a conduit 53 to the point 15 on the dead-end connection 16. The instrument 51 takes the form of a telemetering transmitter of the impulse type, and may be similar to that disclosed in U. S. Letters Patent 2,214,159, issued to applicant's assignee, September 10, 1940. In this instrument a pointer 54, mechanically connected to the pressure-sensitive element 52, is caused to traverse a scroll plate 55 rotated at a constant velocity by an electric motor 56. The scroll plate 55 has an arcuate leading edge and a spiral trailing edge adapted to engage said pointer whereby, through a rocker plate 57, adapted to be actuated by the displacement of said pointer from its normal plane of excursion through engagement with the scroll plate 55, a circuit-controlling element 58 may be actuated to close and open a contact 58' in response to the engagement and disengagement of said pointer by the scroll plate. The motor 56 is supplied with electric power from a source 59, and power from the same source is caused to flow through a two-conductor circuit 60 in series with the contact 58', controlled by the element 58, to the electromagnet 27 on the receiving apparatus 25 in the instrument 17; whereby said electromagnet 27 will be energized, in each of successive cycles of rotation of the scroll plate 55, for a duration governed by the position of the pointer 54 in the instrument 51, and therefore by the pressure as measured at the point 15 in the gas main 16.

Thus the lever 19 on the mechanism 25 will be positioned in response to the pressure as measured at the selected point on the gas distribution system. The vane 19' will therefore have its controlling action modified in accordance with the pressure at the point 15, so that the ultimate control effected by the regulator 10 will maintain the pressure at said point at a predetermined value.

The apparatus as thus far disclosed is well-known in the practice of natural gas distribution, and for it no invention is herein claimed. Practical operation of systems of this nature have shown that certain troubles which may develop in such a system may be productive of undesirable operating characteristics. For example, failure of electric power at the source of supply 59, or a defect developing in the instrument 51 or in the circuit 60, may cause the lever arm 28 in the instrument 17 to be deflected to one extreme or the other of its path, whereby the instrument 17 will tend to regulate the pressure of the gas to an abnormally high or an abnormally low value. Again, failure of electric power at the source 48 or trouble in the motor 26 may likewise cause false regulation on the part of the instrument 17.

An auxiliary instrument 61 includes two pressure-sensitive elements 62 and 63, each connected through a conduit 64 to the pipe line 12 at the "downstream" side of the regulator 20, whereby they are made responsive to the pressure at that point. Attached to the element 62 by a link 65 is an arm 66 pivoted about an axis 67 and adapted to be deflected thereabout through a limited angle by movement of said element in response to changes in pressure applied thereto. An arm 68, also pivoted about the axis 67, is adapted to be engaged by the arm 66 when the pressure applied to the element 62 attains a value below a predetermined minimum as established by an adjustable abutment 69 carried by the arm 68 coacting with a projecting lug 70 forming a part of the arm 66. Attached to the element 63 by a link 71 is an arm 72 pivoted about an axis 73 and adapted to be deflected thereabout through a limited angle by movement of said last-named element. An arm 74, also pivoted about the axis 73, is adapted to be engaged by the arm 72 when the pressure applied to the element 63 attains a value exceeding a predetermined maximum as established by an adjustable abutment 75 carried by the arm 74 coacting with a projecting lug 76 forming a part of the arm 72.

The arms 68 and 74 are connected together by an extended link 77 hinged at a point intermediate said arms and pivotally attached at said point to a lever arm 78 which is pivotally mounted upon the base of the instrument 61. The arm 78 carries a narrow vane 79 cooperating with an orifice member 80 (which may be similar to member 18) to obstruct the escape of pressure fluid from the jets thereof when said arm 78 is in its middle position. A centering spring 81 extended between a point on the link 77 and a point 82 on the framework of instrument 61, tends to maintain lever arm 76, link 77, and arms 68 and 74 in said central or neutral position lying between said predetermined minimum and maximum values whereby the vane member 79 normally obstructs the jets of orifice member 80.

A further orifice member 81', similar to member 18, is mounted within the instrument 61 and has cooperating therewith a vane member 82' carried by a lever 82, which is pivoted for deflection through a limited angle about a fixed axis 83 and is connected by a link 84 to the lever 19 on the receiving mechanism 25 in instrument 17. The vane 82' is made of such a width that, so long as the lever 19 operates within its normal angle of deflection, said vane will obstruct the jets of orifice member 81', but as the arm 19 reaches either extreme of its path of excursion said vane will be moved out of the field of said jets and will cease to obstruct the escape of pressure fluid from the same. Orifice members 80 and 81' are connected to a conduit 85 which communicates with the interior of a bellows member 86 and is connected through a constriction 87 to the conduit 21. A three-way pilot valve 88, adapted for operation by the bellows 86, is connected by means of a conduit 89 to receive a supply of pressure fluid from the low pressure side of regulator 46 and to deliver pressure fluid to a conduit 90, the action of the valve being such that, upon removal of pressure within said bellows, conduits 89 and 90 are placed in free intercommunication, and when pressure is applied within the bellows, conduit 90 is cut off from communication with conduit 89 and is vented to the atmosphere. A three-way, diaphragm operated valve 91 is connected to the diaphragm of pneumatically actuated loading element 39 through the conduit 40 in such a manner as to admit pressure fluid to said conduit from the conduit 33 or to place conduit 40 in communication with a conduit 92, according to whether fluid pressure is released from, or applied to, the diaphragm of valve 91.

An auxiliary regulating instrument 93 has mounted thereon two pressure-sensitive elements 94 and 95, both connected to the conduit 64, whereby they are made responsive to pressure at the "downstream" side of the regulator 10. Attached to the element 94 by means of a linkage 96 is a pointer arm 97 carrying an index 98 cooperating with a graduated scale 99 to provide a measure of the pressure in conduit 64. Connected to element 95 by means of a link 100 is a movable arm 101 pivoted about an axis 102 on the framework of instrument 93. Mounted also for deflection through a limited angle about the axis 102 is an arm 103. The arm 101 is resiliently coupled to the arm 103 by a connection which includes a bifurcated part carried by the arm 101 and between the extremities of which are extended two tension springs 105 and 106, both attached to the arm 103, whereby the latter is normally maintained in a definite position with respect to the arm 101 and, unless constrained, will deflect integrally therewith.

Pivotally mounted about a fixed axis 107 in the instrument 93 is a lever member 108 having a braking surface 109 adapted to be engaged by a brake member 110, and thereby constrained from deflection about said axis. The brake member 110 is operatively associated with a bellows member 111, adapted for actuation by internal fluid pressure, in opposition to the influence of a spring 112, whereby, when fluid pressure exists in said bellows, said braking member will engage the braking surface 109, and when fluid pressure is released from the interior of said element the brake member 110 under the influence of spring 112 will be withdrawn from engagement with the surface 109. The interior of bellows 111 is directly connected to conduit 90, and therefore made responsive to pressure as controlled by the three-way valve 88 in the instrument 61.

An orifice member 113, similar to member 18 and located within the instrument 93, is connected to a conduit 114 adapted to receive pressure fluid through a constriction 115 from a conduit 116, and has cooperating therewith a vane member 117 rotatable about a spindle 118 mounted on the frame of said instrument. A three-way pilot valve member 119, actuated by a bellows member 120 connected to the conduit 114, is adapted to receive pressure fluid from conduit 116 and to regulate a supply of the same into conduit 92 according to the position of said bellows member. The arrangement of these last-named parts is such that upon the vane 117 cooperating with the jets of orifice member 113 to obstruct the escape of pressure fluid therefrom, there will be built up a pressure within the conduit 114, inflating the bellows 120 in a sense to lower the fluid pressure in conduit 92; and, upon the vane 117 being moved out of engagement with the orifice member 113, the escape of pressure fluid therefrom, coupled with the effect of the constriction 115, will cause the pressure in the bellows 120 to be reduced, shifting the valve 119 to a position whereby a pressure of the fluid from conduit 116 will be built up within the conduit 92.

A differential lever member 121 having thereon three pivot points of connection, one at each extremity, and one intermediate its extremities, is pivoted at said intermediate point upon the vane member 117. One of the said extreme points is connected to the link 96 and thereby to the pressure sensitive element 94; and the other end is connected by means of a link 122 to the arm 103. A further differential lever 123 having three pivot points of connection, one at each extremity and one therebetween, is pivoted at said intermediate point upon an extended arm 124 forming a part of the lever member 108. One extremity of said last-named differential lever is attached by means of a rigid link 125 to the arm 103; and the other extremity of said lever carries a pivoted nut 126 threadedly engaging a thumb-screw 127 rotatably mounted on the frame of the instrument 93, whereby said last-named extremity of lever 123 may be manually adjusted through a limited range. A pointer-arm 128 mounted coaxially with the arm 97 and connected to the arm 103 by means of a link 129, carries an index 130 adapted to indicate upon the graduated scale 99 the deflected position of arm 103 without respect to the position of the arm 97.

A diaphragm operated valve 131, adapted for operation by pressure fluid in the conduit 90, is connected between the conduits 89 and 116 in such a manner that when fluid pressure is applied to the operating element of said valve, said conduits will be placed in communication with each other, and when fluid pressure is removed from said valve conduit 116 will be shut off from conduit 89.

Operation of the control system embodying the invention will be best understood by considering the performance of the several elements thereof under various conditions which may arise, and noting the resultant effect upon the ultimate control. These conditions may be grouped under the following heads:

(1) Normal operation

Under normal operating conditions, both the sources of electric power 48 and 59 will be energized; the electric motors 26 and 56 in the regulating and transmitting instruments respectively will be operating; the circuit 60 will be complete, and the receiving unit 25 continually tending to position the vane 19' in response to cyclical impulses developed by the mechanism of instrument 51. The solenoid valve 47 being energized from the source 48, and the reducing valve 46 properly adjusted, there will be available at the instrument 17 through the conduit 21 a continuous supply of pressure fluid for purposes of operating the regulating apparatus. The vane 79 in the instrument 61 being in its center position, corresponding to regulated gas pressure being within the normal control range, as established by the adjustments 69 and 75 associated with the Bourdon springs 62 and 63 respectively, and the vane 82' lying within the orifice member 81', pressure will be built up in the conduit 85, the bellows 86 inflated, and the valve 88 actuated in a sense to close off any supply of pressure fluid from the conduit 89 to the conduit 90, and vent the latter to the atmosphere. Pressure within the conduit 90 being atmospheric, the diaphragm valve 131 will stand closed, and the three-way valve 91 will provide a connection between conduits 33 and 40, whereby, as hereinbefore set forth, the instrument 17 will impose upon the regulator 10 a controlling influence tending to maintain at the distribution center of the system a constant and predetermined pressure of gas.

Under normal operating conditions the Bourdon springs 94 and 95 in the auxiliary regulator 93 will both respond to variations in controlled pressure at the delivery side of the regulator 10, as communicated to said springs by the conduit 64. There being no pressure within the conduit 90, the bellows member 111 will remain deflated, and the brake member 110 maintained out of engagement with the braking surface 109 by action of the spring 112. The differential lever 123 is thus free to swing about its pivot point on the nut 126, and arms 101 and 103, being maintained integral by the springs 105 and 106, will be deflected as a unit about the axis 102 under influence of the Bourdon spring 95 acting through the link 100. The pointer arm 128, being connected to the arm 103 by the link 129 will be deflected with movement of said arm, so that, so long as arms 103 and 101 move as a unit, the index 130 will provide on the scale 99 a measure of pressure as determined by the Bourdon spring 95.

Tho Bourdon spring 94, being connected to the conduit 64, will also be deflected with changes in pressure therein; and, acting through link 96, will actuate a pointer arm 97, whose index 98 will provide on the scale 99 a measure of pressure applied to said last-named Bourdon spring. The two Bourdon springs 94 and 95 and their associated elements are so positioned, proportioned, and adjusted that under normal operating conditions the two indices 98 and 130 move together, and read on the same point of the graduated scale 99. The differential lever 121, being linked to the Bourdon spring 94 and to the arm 103, which normally moves with the Bourdon spring 95, partakes of the joint influence of these sensitive elements; and the relative parts are so positioned and adjusted that the effects of the two Bourdon springs on said lever are equal and opposite, so that, so long as the arms 101 and 103 are deflected as a unit, the floating lever 121 is subjected only to rotary motion about its intermediate pivot point located on the vane member 117, and the latter remains at rest with respect to the orifice member 113. It will be observed that, so long as the brake member 110 is not engaged with the braking surface 109 and the lever member 108 is free to move, adjustment of the extremity of the floating lever 123 by manipulation of the screw 127 will only cause the lever member 108 to have its position varied, and will produce no effect on the position of the arm 103 or upon setting of the measuring or controlling elements of the instrument 93.

(2) Failure of electric power

The principle of operation of the receiving mechanism 25 in the instrument 17, as is fully set forth in the hereinbefore mentioned Patent No. 2,040,918, is such that upon the electromagnet 27 ceasing to receive cyclical impulses, the spindle 28 will immediately be deflected to one or the other of its extremes of travel, according to whether the magnet remains energized or de-energized. Such a condition would develop in the event of failure of the electric supply 59, interruption of the circuit 60, or any defect in the motor or mechanism of instrument 51 which might result in termination of the succession of cyclic impulses necessary to the operation of the receiving mechanism 25. Upon deflection of the spindle 28 to either of its extremes, the vane member 82', connected to the receiving mechanism by the link 84, will be deflected about the axis 83 to an extent that it no longer obstructs the escape of pressure fluid from the orifice member 81'. Because of the constriction 87, pressure in the conduit 85 will at once fall to a low value, deflating the bellows member 86, causing the valve 88 to be opened in a sense to cut conduit 90 off from communication with the atmosphere, and admit thereto pressure fluid from the conduit 89. In the event of failure of the electric power supply 48 at the regulating instrument, the motor 26 will come to rest, and will no longer be able to position the vane member 19' in a sense to effect regulation. Under this condition, however, the solenoid valve 47 will be de-energized, and will at once shut off the supply of pressure fluid not only to the regulator 17 but also to the elements of the instrument 61, whereby the bellows 86 will become deflated, and the valve 88 opened. Since the conduit 89 receives its supply of pressure fluid from a point between the reducing valve 46 and the solenoid valve 47, said fluid will be admitted freely to the conduit 90 whether valve 47 be opened or closed. Thus, under any condition involving failure of electrical circuits or supply, pressure will at once be built up in said conduit 90 and applied to the diaphragm tops of valves 131 and 91. Application of pressure to the diaphragm valve 131 will cause the same to be opened, placing conduit 116 in communication with conduit 89, making available a supply of pressure fluid for the operation of the auxiliary regulator 93. Application of pressure to the three-way valve 91 will cause the conduit 40 to be cut off from communication with the conduit 33 and placed in communication with the conduit 92 adapted to receive a supply of pressure through the three-way pilot valve 119, thus transferring from pilot valve 32 to pilot valve 119 the function of regulating fluid pressure applied to the diaphragm member 39. Pressure within the conduit 90 will be communicated to the bellows member 111, which, overcoming the spring 112, will force the brake member 110 into engagement with the braking surface 109, locking the lever member 108 against movement so long as said pressure exists. The intermediate pivot point of the floating lever 123 will thus become fixed; and, so long as the adjustment 127 is not operated, the whole of said floating lever will be stationary, so that said lever, acting through the rigid link 125, will serve to lock the arm 103 and all parts linked thereto, including the pointer arm 128 and one extremity of floating lever 121, against further motion. The index 130 will thus indicate on the scale 99 the pressure within the conduit 64 at the moment the auxiliary apparatus went into action.

Further variations of pressure within the conduit 64 will cause the Bourdon spring 94, acting through the link 96, to affect the position of one extremity of the floating lever 121; and, the other extremity of said lever being locked, the vane member 117 will become responsive to such changes, coacting with the orifice member 113 to actuate the bellows member 120 and the three-way pilot valve 119 to control fluid pressure within the conduit 92 and the conduit 40, thus serving to control the pressure of gas on the delivery side of regulator 10 to maintain substantially the pressure which existed at the moment when the auxiliary apparatus went into operation. While the arm 103 remains locked in position, the resiliency of the springs 105 and 106 will permit motion of the arm 101 in response to deflection of the Bourdon spring 95 with variations in gas pressure, and will prevent any undue strains upon that part of the mechanism. The pointer arm 97 will continue to be deflected with motion of the Bourdon spring 94, and its index will thus provide on the scale 99 a measure of the actual controlled pressure of gas on the downstream side of the regulator, as compared with the fixed indication of the index 130, representing the pressure at the instant the auxiliary apparatus went into action and thus the automatically established control value toward which regulation is directed. Manual adjustment of the screw 127, by shifting the lever 123 about its intermediate pivot point, will correspondingly move one extremity of the lever 121, and also the pointer arm 128, thus making possible the setting of the control point established by the instrument 93 to any desired value, which will be indicated by the index 130 on the scale 99, and enabling a compensation for loss of head due to different flow rates to be readily introduced until complete automatic control is reestablished. Thus, it will be clear that, in the event of failure of the electric power supply at either end of the system or of any of the electrical circuits, automatic regulation of pressure will be continued through purely fluid-pressure-actuated instrumentalities, the only sacrifice lying in the transfer of the constant pressure point from the selected location to the regulator.

(3) Mechanical failure

While the operation of the control apparatus as hereinbefore set forth will serve to meet abnormal conditions arising from failure of electrical circuits, it is not impossible that situations may arise (such as sticking, clogging, or leakage in a valve part, or in mechanical failure of associated elements) which would not be at once reflected in deflection of the vane 82' to either limit of its excursion or in closing of the solenoid valve 47. The obvious immediate effect of such malfunctioning will be found in the regulated gas pressure rising above a pre-established maximum value or falling below a pre-established minimum. In order to meet such a condition, there are provided in the auxiliary instrument 61 the pressure-sensitive Bourdon springs 62 and 63, and elements actuated thereby. The adjustable abutments 75 and 69 are manually set to positions corresponding respectively to the permissible maximum and minimum pressures defining the normal zone of operation; and normally neither of these abutments is engaged by the corresponding lugs on the arms associated with the respective Bourdon springs. The centering spring 81, acting on the arm 78 maintains the same in its mid-position with the vane element 79 obstructing the jets of the orifice member 80 and preventing the escape of pressure fluid therefrom.

Should the controlled pressure for any reason exceed the permissible maximum value, the lug 76 carried by the arm 72, under the influence of Bourdon spring 73, will engage the adjustable abutment 75, causing the arm 74 to be deflected, and to act through the link 77 in opposition to the centering influence of the spring 81 to swing the arm 78 and deflect the vane member 79 to a position where it no longer obstructs the jets of the orifice member 80. Escape of pressure fluid from the orifice member 80 will be reflected in a lowering of pressure in the conduit 85, deflation of the bellows member 86, and opening of the pilot valve 88, causing a pressure to be built up in the conduit 90, as hereinbefore set forth under the heading of "Failure of electric power," with resultant transfer of the controlling function to the auxiliary regulator 93, and the avoidance of hazardous conditions.

In the same manner, should the controlled pressure for any reason fall below the permissible minimum, as established by the setting of the adjustable abutment 69, the Bourdon spring 62, acting through the arms 66 and 68 and the link 77, will deflect the arm 78 in the opposite direction to that corresponding to abnormally high pressure, but again moving the narrow vane 79 out of operative relation to the orifice member 80, causing the pressure in the conduit 90 to be reduced, and control transferred to the auxiliary instrument 93 as hereinbefore set forth.

Thus there has been provided an automatic adjustment of the loading of a gas regulator whereby there is maintained a predetermined constant pressure at a selected distribution center, together with means for ensuring continued regulation and the avoidance of hazardous conditions in the event of failure of electric power or interconnecting circuits or of malfunctioning of the controlling equipment.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a system for the distribution of a fluid at a regulated pressure: a main controller for regulating said pressure and responsive only to cyclical impulses to establish the value of said pressure, and an instrument for producing in successive uniform time cycles a series of impulses representative of values of a pressure to be regulated, electrical means for communicating said impulses to said main controller, an auxiliary controller dependent for its operation solely upon fluid pressure conditions, and means for transferring the regulating function from said main controller to said auxiliary controller upon cessation of said series of impulses.

2. In a system for the distribution of a fluid at a regulated pressure: a loaded regulator for governing said pressure, a main controller for modifying the action of said regulator and including a continuously running electric motor and a circuit for the same, an auxiliary controller dependent for its operation solely upon fluid pressure conditions, and means comprising electrically-actuated valve means energized from said circuit for transferring the modifying function from said main controller to said auxiliary controller upon deenergization of said circuit.

3. In combination: a main control instrument adapted to perform a regulating function upon a variable within a limited range of variation, a normally inactive auxiliary control instrument adapted alternatively to perform said function, selector means for bringing said auxiliary instrument into action and transferring said control function from said main to said auxiliary instrument, and a relay instrument including means adapted to be actuated by said main control instrument for operation of said selector means when said range is exceeded.

4. In combination: a main control instrument adapted to perform a regulating function upon a variable within a limited range of variation, an auxiliary control instrument adapted alternatively to perform said function, fluid-pressure-actuated selector means for transferring said function from said main to said auxiliary instrument, valve-means for controlling the admission of pressure fluid to said selector means for actuation of the same, and means actuated from said main control instrument and adapted to actuate said valve means when said range is exceeded.

5. In combination: a main control instrument adapted to perform a regulating function upon a variable within a limited range of variation, an auxiliary control instrument adapted alternatively to perform said function, fluid-pressure-actuated selector means for transferring said function from said main to said auxiliary instrument, valve-means for controlling the admission of pressure fluid to said selector means for actuation of the same, and means mechanically actuated from said main control instrument and adapted to actuate said valve means when said range is exceeded.

6. In combination: a main control instrument adapted to perform a regulating function upon a variable within a limited range of variation, an auxiliary control instrument adapted alternatively to perform said function, fluid-pressure-actuated selector means for transferring said function from said main to said auxiliary instrument, valve-means for controlling the admission of pressure fluid to said selector means for actuation of the same, and means sensitive to changes in said variable and adapted to actuate said valve means when said range is exceeded.

7. In a control instrument: a control couple adapted to the regulation of a variable, means responsive to changes in said variable, a normally ineffective mechanical train between said couple and said means, whereby said couple is normally insensitive to response of said means, means responsive to a condition of said variable and adapted to establish said train to render said couple sensitive to response of said first-named means, together with means adapted at all times to indicate the value of said variable and means rendered effective at the instant of establishment of said train to provide during the time of such establishment an indication of said variable at said instant.

8. In a system for regulating the value of a variable, a main control instrument, an auxiliary control instrument including a control couple adapted to the regulation of said variable, means responsive to changes in said variable, a normally ineffective mechanical train between said couple and said means, whereby said couple is normally insensitive to response of said means, and means responsive to a condition in said main controller and adapted to establish said train to render said couple sensitive to responses of said first-named means, together with means effective only when said train is complete for superimposing a manual adjustment upon said couple.

9. In a control instrument: a control couple adapted to the regulation of a variable, differential means adapted to the actuation of said couple, two elements sensitive to variations in external influences, means providing a direct connection between one of said elements and said differential means, a mechanical train providing connection between the other of said elements and said differential means, and including a floating lever having a movable fulcrum, a resilient member having two parts adapted to operate as an integral unit when neither of said parts is restrained, means subject to an external influence for restraining one of said parts, and manually adjustable means for moving the fulcrum of said floating lever.

10. In a control instrument: a control couple adapted to the regulation of a variable, differential means adapted to the actuation of said couple, two elements sensitive to variations in external influences, means providing a direct connection between one of said elements and said differential means, a mechanical train providing connection between the other of said elements and said differential means, and including a floating lever having a movable fulcrum, a resilient member having two parts adapted to operate as an integral unit when neither of said parts is restrained, means subject to an external influence for restraining one of said parts, manually adjustable means for moving the fulcrum of said floating lever, together with means to indicate at all times the position of one of said sensitive elements, and means to indicate the position of said restrained part.

11. In a control instrument: a control couple adapted to the regulation of a variable, means responsive to changes in said variable, a linkage including a differential member, a locking member and a resilient member and providing a dual mechanical train between said variable-responsive means and said control couple whereby, when said locking member is released, said train, acting through said differential member, subjects said control couple to equal and opposed influences, and, when said locking member is engaged, said resilient member will yield to permit said couple to be subjected to an influence representative of said response of said variable-responsive means to regulate said variable, together with means subject to a condition of said variable for actuating said locking member.

12. In a fluid-pressure-actuated controller, valve means adapted to affect a pressure fluid for control purposes, differential means adapted to the actuation of said valve means, pressure sensitive means, a plurality of linkages between said last-named means and said differential means, whereby the net effect of said sensitive means upon said valve means is normally nil, together with further means for locking one of said linkages, whereby the net effect of said sensitive means upon said valve is made representative of variations in the pressure applied to said pressure-sensitive means.

13. In a fluid-pressure-actuated controller: valve means adapted to affect a pressure fluid for control purposes, differential means adapted to the actuation of said valve means, pressure-sensitive means, a plurality of linkages between said last-named means and said differential means, and adapted to render the net effect of said sensitive means upon said valve means normally nil, together with further means including a yielding element and adapted for locking one of said linkages, whereby the net effect of said sensitive means upon said valve is made representative of variations in the pressure applied to said sensitive means.

14. In a system for the distribution of a gaseous fluid at a regulated pressure: a main controller for regulating said pressure, an auxiliary controller for alternatively regulating said pressure, valve means in said auxiliary controller adapted to affect a pressure fluid for regulating said first-named pressure, pressure-sensitive means responsive to said regulated pressure, a linkage between said pressure-sensitive means and said valve means, including means whereby the net effect of said sensitive means upon said valve means is normally nil, together with means responsive to abnormal conditions in said main controller for modifying said linkage whereby the net effect of said sensitive means upon said valve is made representative of variations in said regulated pressure, and means also responsive to said conditions for transferring the regulating function from said main controller to said auxiliary controller.

15. In a control instrument: a control couple adapted to the regulation of a variable, measuring means sensitive to changes in said variable, a linkage including a differential member connected to an element of said couple, and two mechanical trains connecting said measuring means to said differential member, one of said trains providing a direct connection, and the other train including a yielding member having one part directly connected to said sensitive means and another part connected to said differential member, said parts being interconnected through resilient elements tending to maintain said parts integral, whereby, so long as said parts remain integral, the influences conveyed from said sensitive means to said control couple are equal and opposite, together with a locking element subject to a condition of said variable, and adapted to lock one of said parts, rendering said couple responsive to changes in said variable, said resilient elements yielding to permit relative motion between said parts.

16. In a system for the distribution of a gaseous fluid at a regulated pressure, a main controller for regulating said pressure, a normally inactive auxiliary controller for regulating said pressure, and means responsive to failure of effective regulation by said main controller for bringing said auxiliary controller into action to maintain the pressure at a given point in said system at substantially the value obtaining when said auxiliary controller is brought into action.

17. In a system for the distribution of a gaseous fluid at a regulated pressure, a main controller for regulating said pressure, a normally inactive auxiliary controller for regulating said pressure, means responsive to failure of effective regulation by said main controller for bringing said auxiliary controller into action to maintain the pressure at a given point in said system at substantially the value obtaining when said auxiliary controller is brought into action, and manually operable means for altering at will the action of said auxiliary control means to maintain said pressure at another value.

18. In a system for the distribution of a fluid at a regulated pressure: a main controller for regulating said pressure and responsive to the durations of cyclical impulses to establish the value of said pressure, and an instrument for producing in successive uniform time cycles a series of impulses having durations commensurate with values of a pressure to be regulated, electrical means for communicating said impulses to said main controller, an auxiliary controller dependent for its operation solely upon fluid pressure conditions, and means for transferring the regulating function from said main controller to said auxiliary controller upon cessation of said series of impulses.

EUGENE H. HART.